United States Patent
Mueller et al.

(10) Patent No.: US 12,187,617 B2
(45) Date of Patent: Jan. 7, 2025

(54) METHOD AND APPARATUS FOR REMOVAL OF SURFACE CARBON FROM POLYSILICON

(71) Applicant: HEMLOCK SEMICONDUCTOR OPERATIONS LLC, Hemlock, MI (US)

(72) Inventors: James J. Mueller, Saginaw, MI (US); Brian S. Cichowski, Saginaw, MI (US); Mark Loboda, Bay City, MI (US); James C. Mundell, Saginaw, MI (US); Christopher S. Robinson, Saginaw, MI (US); Vasgen A. Shamamian, Midland, MI (US)

(73) Assignee: HEMLOCK SEMICONDUCTOR OPERATIONS LLC, Hemlock, MI (US)

( * ) Notice: Subject to any disclaimer, the term of this patent is extended or adjusted under 35 U.S.C. 154(b) by 1111 days.

(21) Appl. No.: 17/064,789

(22) Filed: Oct. 7, 2020

(65) Prior Publication Data
US 2021/0114885 A1   Apr. 22, 2021

Related U.S. Application Data

(60) Provisional application No. 62/924,222, filed on Oct. 22, 2019.

(51) Int. Cl.
*C01B 33/037* (2006.01)
*B08B 5/02* (2006.01)

(52) U.S. Cl.
CPC ............ *C01B 33/037* (2013.01); *B08B 5/023* (2013.01); *C01P 2004/03* (2013.01); *C01P 2004/60* (2013.01); *C01P 2006/80* (2013.01)

(58) Field of Classification Search
CPC .............................. C01B 33/037; B08B 5/023
See application file for complete search history.

(56) References Cited

U.S. PATENT DOCUMENTS

| 4,555,303 A | 11/1985 | Legge et al. |
| 5,445,679 A | 8/1995 | Hansen et al. |
| (Continued) | | |

FOREIGN PATENT DOCUMENTS

JP   2013131811 A   7/2013

OTHER PUBLICATIONS

Thermconcept, Thermal Process Technology, 2024, Thermconcept, Equipment Brochure, 1-28 (Year: 2024).*

*Primary Examiner* — James A Fiorito
(74) *Attorney, Agent, or Firm* — Mark S. Cohen; PEARL COHEN ZEDEK LATZER BARATZ LLP

(57) ABSTRACT

A method of removing surface carbon contamination from polycrystalline silicon comprises providing a polycrystalline silicon feed stream having surface carbon contamination, subjecting the polycrystalline silicon to a high velocity fluid selected from gas, gas/liquid mixtures, gas/solid mixtures and gas/solid/liquid mixtures to form a product stream comprising polycrystalline silicon having surface carbon in an amount of less than 200 parts per billion by weight based on weight of the polycrystalline silicon product and/or a reduction in surface carbon contamination of at least 20%. A system for conducting the method comprises an enclosure, a conveyer for moving a polycrystalline silicon feed stream through the enclosure, at least one stream of a high velocity fluid passing through outlets in the enclosure and directed at the feed stream, an ionizing source in the enclosure or integrated with the at least one stream of high velocity fluid, and an exhaust system for the enclosure.

17 Claims, 2 Drawing Sheets

(56) References Cited

U.S. PATENT DOCUMENTS

| | | | |
|---|---|---|---|
| 8,747,794 B2 | 6/2014 | Pech et al. | |
| 9,209,009 B2 | 12/2015 | Traunspurger et al. | |
| 2009/0223539 A1* | 9/2009 | Gibbel | H01L 31/18 134/2 |
| 2016/0339485 A1 | 11/2016 | Nishimura et al. | |

* cited by examiner

METHOD AND APPARATUS FOR REMOVAL OF SURFACE CARBON FROM POLYSILICON

CROSS-REFERENCE TO RELATED APPLICATIONS

This application is a Non-provisional of U.S. patent application Ser. No. 62/924,222, filed Oct. 22, 2019, the disclosure of which is incorporated by reference herein in its entirety.

FIELD OF INVENTION

The invention relates to a method and apparatus for removal of carbon contaminants from polycrystalline silicon.

BACKGROUND

Polycrystalline silicon (e.g. comminuted polycrystalline silicon rod pieces) has various uses, such as use in production of polycrystalline silicon ingot blocks or silicon ingot crystals. The crystals can be produced by the Czochralski (CZ) crystal growth method. The silicon blocks/crystals can be converted to wafers which used in the manufacture of solar cells and semiconductor devices. Contamination of polycrystalline silicon (e.g. from the comminution process, packaging processes, transport processes, etc.) can impart carbon contamination to the surface of the polysilicon (e.g. in the form of organic compounds). The surface carbon contamination can lead to product defects for the users of the comminuted polycrystalline silicon in their operations n producings commercial products such as solar cells or semiconductor devices. Thus, various methods of minimizing surface carbon contamination have been proposed. For example oxidative atmospheres, such as oxygen plasmas have been proposed to remove carbon by reaction with the carbon species. See e.g. U.S. Pat. No. 5,445,679 or 4,555,303. Thermal treatment in inert gas has also been proposed. See e.g. U.S. Pat. No. 9,209,009. These systems generally require chemical reaction and/or phase change to remove the carbon contaminants and can be complex and/or require a substantial amount of energy.

A need remains for alternative efficient means of carbon contaminant removal from polycrystalline silicon.

BRIEF DESCRIPTION

Disclosed herein is a method comprising: providing a feed (i.e., input) stream comprising polycrystalline silicon (e.g. pieces of polycrystalline silicon) having surface carbon contamination; subjecting the polycrystalline silicon to high velocity fluid to form a product (or output) stream comprising polycrystalline silicon (e.g. pieces of polycrystalline), having surface carbon in an amount of less than 250, preferably less than 200 parts per billion by weight (e.g. based on weight of the polycrystalline silicon product). The process can further comprise taking a sample of the output stream polysilicon pieces, performing a test for surface carbon and, optionally, adjusting one or more of the rate of the feed stream, the rate of the high velocity fluid or another condition (e.g. exhaust rate) to further lower the amount of surface carbon.

Also disclosed herein is a method comprising: providing an input (i.e. feed) stream comprising polycrystalline silicon (e.g. in pieces) with an initial level of surface carbon contamination; subjecting the polycrystalline silicon to an impinging flow of Argon gas at a speed of at least 1 meter per second to form an output (i.e. product) stream comprising polycrystalline silicon pieces. The process can further comprise taking a sample of the output stream polysilicon pieces, performing a test for surface carbon and, optionally, adjusting one or more of the rate of the feed stream, the rate of the high velocity fluid or another condition (e.g. exhaust rate) to further lower the amount of surface carbon.

Also disclosed herein is a method comprising: providing a feed stream comprising polycrystalline silicon (e.g. in pieces) having surface carbon contamination at an initial amount; subjecting the polycrystalline silicon to high velocity fluid to form a product stream comprising polycrystalline silicon, having surface carbon in an amount which is at least 20%, preferably at least 30% less than the initial amount of surface carbon contamination. The process can further comprise taking a sample of polycrystalline silicon in the feed stream and testing to determine the initial amount of carbon contamination and taking a sample of the product stream and testing to determine an amount of carbon contamination in the product stream.

Also disclosed is a system for removing surface carbon contamination from polycrystalline silicon (e.g. pieces of polycrystalline silicon) comprising an enclosure; a conveyer for moving polycrystalline silicon through the enclosure; at least one source for a stream or flow of a high velocity fluid passing through outlets into the enclosure and where such stream or flow is directed at the polycrystalline silicon in the enclosure; an ionizing source in the enclosure or integrated with the at least one stream of high velocity fluid, and an exhaust system for the enclosure.

The above described and other features are exemplified by the following figure and detailed description.

DETAILED DESCRIPTION

Figure 1:
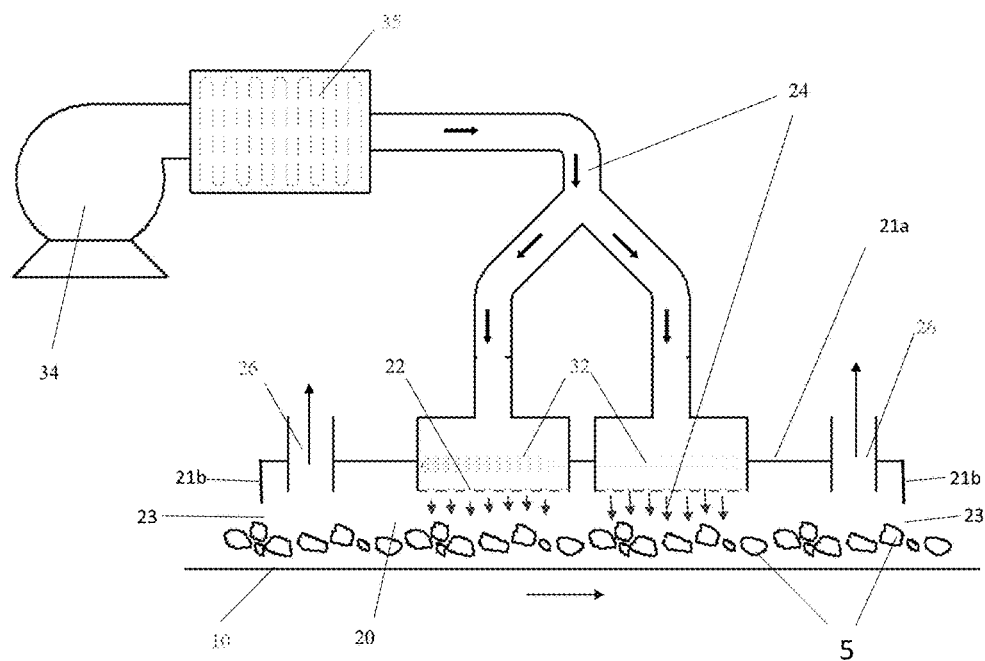
FIG. 1 is a schematic of one embodiment of a system according to the present invention.

While prior approaches to removing carbon contaminants (particularly surface carbon contaminants) involved chemical reaction and/or thermal treatments, it was surprisingly found that directing high velocity fluid on polycrystalline silicon having surface carbon contamination can be effective at reducing the carbon contamination to desired values.

Thus, disclosed herein is a method comprising providing a feed (also referred to as an input) stream comprising polycrystalline silicon having surface carbon contamination, subjecting the polycrystalline silicon to high velocity fluid to form a product (also referred to as an output) stream comprising polycrystalline silicon having surface carbon in an amount of less than 250, or less than 200, or less than 160 parts per billion by weight (e.g. based on weight of the polycrystalline silicon product.

The polycrystalline silicon in the feed stream can be in any form. The feed stream can consist or can consist essentially of the polycrystalline silicon having surface contamination. The polycrystalline silicon in the feed stream can comprise pieces of polycrystalline silicon. For example, the pieces of polycrystalline silicon can be presorted to desired dimensions. For example, the feed stream can have at least 90% or at least 95% of the pieces of polycrystalline silicon having a longest dimension of at least 2, or at least 5, or at least 8, or at least 10, or at least 20 mm up to 250, or up to 200, or up to 150, or up to 100, or up to 80, or up to 50 mm. For example, at least 90% or at least 95% of the pieces of polycrystalline silicon in the feed stream can have a longest dimension of 20 to 50 mm. The polycrystalline silicon in the feed stream can have a shortest dimension and a longest dimension, and it could be for example, the ratio of the longest dimension to the shortest dimension is at least 0.2 or at least 1 or at least 2 or at least 4 or at least 10, for example a longest up to 100, or up to 80, or up to 50, or up to 30 mm. The ratio of the shortest dimension to the longest dimension can, for example, be from 0.1:1, or from 0.2:1 or from 0.3:1 or from 0.4:1 up to 1:1, or up to 0.95:1 or up to 0.9:1. The polycrystalline silicon feed stream is characterized by carbon contaminants, especially carbon contaminants adhered or attached to the surface of the polycrystalline silicon (e.g. the polycrystalline silicon pieces). The feed stream typically can have carbon contamination (i.e. surface carbon contaminants) in amounts of 250 or more, or 300 or more, or 350 or more or 400 or more parts per billion by weight (ppbw) of the feed stream. The feed stream can have carbon contamination as high as 1000 ppbw. The feed stream can have carbon contamination higher that 1000 ppbw. Carbon contamination can be measured, for example, by heating the samples to combust the carbon contaminants in an oxidizing environment and using infrared detection to quantify the amount of carbon in the system (e.g. LECO RC612 Carbon Determinator can be used).

The polycrystalline silicon feed stream can be prepared by any known method such as formation of rods or bars of polycrystalline silicon followed by breaking or crushing of the rods to form the desired particle sizes. For example, polycrystalline silicon rods can be prepared by a chemical vapor deposition (CVD) process comprising chemical vapor deposition of a high purity chlorosilane or silane gas onto a heated substrate, see Handbook of Semiconductor Silicon Technology, edited by William C. O'Mara, Robert B. Herring, and Lee P. Hunt, Noyes Publications, Park Ridge, N.J., U.S.A., 1990, Ch. 2, pp. 39-58. The polycrystalline silicon prepared by the CVD process can be comminuted into suitably sized pieces such as rods, chunks, chips, and combinations thereof. The polycrystalline silicon rods can be comminuted, for example, by striking with a low-contamination impact tool such as that disclosed in EP 0 539 097 A1. This is a labor intensive process. Alternatively, the polycrystalline silicon rods may be comminuted using a jaw crusher. Alternatively, the polycrystalline silicon rods may be comminuted by striking with a low-contamination impact tool and the resulting comminuted rods may be further comminuted using a jaw crusher. After comminuting, particles can be sized and screened to provide desired particle size distribution in the feed stream before sending the feed stream into the enclosure.

The method includes subjecting the polycrystalline silicon (e.g. pieces) to high velocity fluid. The fluid comprises a gas. For example, the fluid can be a gas, a gas/liquid mixture, a gas/solid mixture, or a gas/liquid/solid mixture. According to a preferred aspect, the fluid is a gas. The fluid can be purified or filtered such that the fluid is not adding contaminants to the feed stream. For example, the fluid can be passed through a 10 micron filter, a 5 micron filter, a 1 micron filter or a 0.3 micron filter. The fluid can be air or can be an inert gas, such as nitrogen or argon. According to another aspect the fluid can be dry ice cleaning (e.g. solid carbon dioxide in a pressurized gas stream such as air).

The velocity of the fluid can be at least 1, or at least 3, or at least 4, or at least 5, or at least 6, or at least 10, or at least 15, or at least 20 meters per second (m/s). The velocity of the fluid is not so high as to cause attrition or fracture of the pieces of polycrystalline silicon in the feed stream. The velocity of the fluid can be up to 40, or up to 35 or up to 30 m/s. For example, a fluid which is argon can have a velocity of 1 to 30 m/s. For example, a fluid which is air can have a velocity of from 10 or from 15 up to 40 or up to 30 m/s.

The fluid may be directed onto the polycrystalline silicon via a nozzle or plurality of nozzles.

The method can further comprise taking a sample from the output stream of polysilicon pieces exposed to the fluid and using the sample to assess the final amount of carbon contamination. The method can further comprise taking a sample from the input stream of polysilicon pieces exposed to the fluid and using the sample to assess the initial amount of carbon contamination. For example, the measurement can be performed by heating the samples to combust the carbon contaminants in an oxidizing environment and using infrared detection to quantify the amount of carbon in the system (e.g. LECO RC612 Carbon Determinator can be used). The method can further comprise calculating the amount of reduction of carbon contamination after treatment with the high velocity fluid by comparing the initial amount of carbon contamination and the final amount of carbon contamination. The amount of reduction in surface carbon can be at least 20%, or at least 30%, or at least 40% based on the initial amount of carbon contamination. The method can further include adjusting a rate of the input stream (e.g. conveyor speed or product density on the conveyor), the speed of the high velocity fluid or another aspect such as exhaust rate, to further reduce the amount of surface contamination if the test reveals an undesirably high level of surface carbon contamination in the product (output stream).

The method can further comprise deionizing the polycrystalline silicon particles. This can facilitate removal of the surface carbon contaminants. The deionization can be done by providing ions into the system to neutralize any charge on the surface of the polycrystalline silicon. For example, an ionized high velocity fluid to reduce/eliminate the static charge on the polycrystalline silicon.

Any suitable ionizer can be used. For example, the ionizer can be a corona discharge ionizer (typically where high voltage is supplied to an electrode to generate positive and negative ions but use of alternating current or pulsed direct current) or a photoionizer (e.g. using photoelectric effect to generate ions—e.g. using x-rays atoms near the surface become sufficiently excited to share valence electrons). The devices can produce ions to neutralize a work area (for example, the enclosure). Air flow can direct the ions to the area where neutralization is desired. For example, an ionizing bar can be used. For example, an ionizing bar can be positioned to ionize the fluid prior to contact of the fluid with the polycrystalline silicon. The deionization of the polycrystalline silicon can occur before or during subjecting the polycrystalline silicon to the high velocity fluid. For example, the high velocity fluid can be ionized at the same time the fluid is directed to impinge on the silicon particles thereby deionizing polycrystalline silicon subjected to the high velocity fluid. The use of an ionizer on the high velocity fluid has been found to reduce variation of the amount of carbon contaminant on the treated (blown off) polycrystalline silicon. For example, the variation of surface carbon with the ionized high velocity fluid can be at least 30% or at least 40% less than the variation of surface carbon subjected to high velocity fluid that has not been ionized. For example, the amount of variation in the amount of surface carbon can be less than 150 ppbw, or less than 125 ppbw, or less than 100 ppbw.

The method may further comprise isolating surface carbon contaminants removed by the high velocity fluid to prevent resettling of those contaminants on the polycrystalline silicon. An exhaust system on the enclosure can be used to prevent resettling of the contaminants on the polysilicon or on other surfaces in the enclosure or in the region around the enclosure. The exhaust system can remove the contaminants to a collector, such as a dust collector or a container. The exhaust system can move the gas in the enclosure at a speed sufficient to capture contaminants removed from the surface of the polycrystalline silicon. The exhaust system can move the gas in the enclosure at a volumetric flowrate that is larger than the volumetric flow rate of the high velocity fluid directed at the polycrystalline silicon. For example, an exhaust velocity of at least 2, or at least 3, or at least 4 m/s can be used. The size of an exhaust duct will depend upon the size of the enclosure and will be scaled accordingly. If a dust collector is used it can involve directing air flow from the enclosure through the collector. Heavier particulate falls directly to the bottom of the hopper as velocity decreases. Filters can remove fine particulate. Clean, filtered air can pass through the filter and discharge through the clean-air outlet. Filters may be cleaned for example using pulse-jet technology.

The polycrystalline silicon product after the treatment with the high velocity fluid can have an amount of carbon contamination (e.g. surface carbon contaminants) of less than 250, or less than 200, or less than 150, or less than 100, or less than 50 parts per billion by weight (ppbw) based on total weight of polycrystalline silicon product. The inventors have demonstrated post treatment surface carbon contaminating of 119 ppbw. The amount of surface carbon contaminants before the treatment with the high velocity fluid can be more than 250 or more than 300 or 350 or more or 400 or more parts per billion by weight (ppbw) of the feed stream. The feed stream can have carbon contamination as high as 1000 ppbw.

Also disclosed herein is a system for removing carbon contaminants (e.g. surface carbon) from polycrystalline silicon (e.g. pieces of polycrystalline silicon). Referring to FIG. 1, the system comprises at least one conveyer 10 for moving (shown moving from left to right) the polycrystalline silicon 5 into, through, and out of an enclosure 20. The enclosure 20 can include a cover 21a and sidewalls 21b. The cover and sidewalls can be integrated with the conveyor. Each end of the enclosure has at least one opening 23 in order to allow polycrystalline silicon to move into and out of the enclosure. The enclosure 20 comprises at least one nozzle 22 for directing high velocity fluid 24 at or on the polycrystalline silicon 5. The high velocity fluid can be provided by an impeller element 34, such as a pump, impeller, blower or the like. Optionally, the high velocity fluid may be filtered through a filter 35. The filter is shown located after the impeller element but could be placed before impeller element 34. According to an aspect, the enclosure 20 can comprise one or more exhaust outlets 26 for capture of the carbon contamination removed by the high velocity fluid. The exhaust outlet 26 can direct exhaust and contaminants to a particulate collector (not shown). An exhaust outlet 26 positioned at each end of the enclosure so that contaminants can prevent escape of contaminants into the ambient environment. The conveyer 10 may move into, through and out of the enclosure as shown in FIG. 1 or separate conveyers may be used—one for moving the polycrystalline silicon 5 into the enclosure 2- and another for removing the polycrystalline silicon 5 from the enclosure 20. Alternatively, single conveyer and a single opening 23 could be used in a batch process to move the polycrystalline silicon in and out of the enclosure. The conveyer can be a belt or a vibratory conveyer. The conveyer can be flat or have a trough shape to avoid polycrystalline silicon pieces falling off the conveyer. The conveyer can be a container (e.g. with pores or mesh to permit the fluid to impact the polycrystalline silicon particles). The enclosure can further include a gas ionizer such as gas ionizing sources 32. The ionizer(s) can be integrated with the source of the high velocity fluid (e.g. the nozzles). For example, a Pulsed DC Ionizing Bar (Meech 924S) can be integrated with the air nozzles.

This disclosure is further illustrated by the following examples, which are non-limiting.

Example 1

From a bag of polycrystalline silicon, several pieces are removed with metal tongs. Each piece has a maximum dimension of less than 20 mm and the total weight of the pieces is approximately 15 g. The 15-gram sample is tested for surface carbon using a RC612 Multiphase Carbon Determinator manufactured by LECO Corporation. The test is repeated for thirty 15-gram samples of polycrystalline silicon. The average surface carbon detected was 261 parts per billion based on weight of the sample. The Range of the results for this Control Group is 252 ppbw (from 169 to 421 ppbw).

From the same bag of polycrystalline silicon, a piece is removed with metal tongs. The piece, with maximum dimension of less than 20 mm, is placed in front of a jet of Argon gas at ~1.5 m/s from a variety of orientations sufficient to expose each surface to the jet of Argon. The Argon gas treatment is performed in an exhaust hood such that redeposition of removed contaminants is avoided or minimized Pieces are treated until approximately 15 g are accumulated, this constitutes one sample. Thirty 15-gram samples of polycrystalline silicon are tested in the LECO RC612. The average surface carbon is 155 ppbw thus demonstrating the effectiveness of high velocity gas removal of surface carbon. This is a reduction in surface carbon of about 40%. The Range of the results for this Test Group is 151 ppbw (from 97 to 248 ppvw).

Figure 2:
FIG. 2 is an SEM at 150× magnification of a polycrystalline silicon particle before treatment by the method as disclosed herein.
Figure 3:
FIG. 3 is an SEM at 200× magnification of a polycrystalline silicon particle after treatment by the method as disclosed herein.

Pieces of polycrystalline silicon were imaged with a Scanning Electron Microscope (SEM). The SEM Micrograph showing carbon contaminants on the surface of an untreated piece is shown in FIG. 2. The SEM micrograph of the polycrystalline silicon treated as described above with Argon gas is shown in FIG. 3. Evidence of carbon contaminants could be seen on the samples. The amount carbon contaminant was analyzed with Energy Dispersive X-Ray Spectroscopy (EDX.) Surface Carbon Particle Density was reduced by approximately 50% as determined by simple visual count over a known surface area.

Example 2

From a bag of polycrystalline silicon, a piece is removed with metal tongs. The piece, with maximum dimension of less than 20 mm, is placed in front of a jet of recirculated, filtered air at 1.5-1.8 m/s from a variety of orientations. The piece is set down and re-picked in order to sufficiently expose each surface to the jet of air. The silicon piece is held approximately 25 cm from the face of the nozzle for a total of approximately 20 seconds. This treated piece is considered part of the "Test Sample".

This experiment alternates between Test Samples and Control Samples. Each piece in the "Control Sample" is exposed to the same test method while being shielded from the airstream. Both the Test Sample and the Control Sample were tested in a LECO RC612. The Test Sample showed a surface carbon reduction of ~23 ppbw, an 8.2% reduction in surface carbon. The improvement of 23 ppbw is confirmation that a reduction of surface carbon can be achieved with high velocity air. The Range of the results was reduced from 151 ppbw (228-379) for the Control Group to 96 ppbw (213-309) for the Test Group.

Example 3

The test of Example 1 was repeated with 10 samples as control and 10 samples as test. There was a surface carbon reduction of 111 ppbw (or about 33%) although the final level of surface contamination was higher than in Example 1 potentially due to difference in dust collection or environment. The Range of the results was reduced from 144 ppbw (252-396) for the Control Group to 141 ppbw (145-286) for the Test Group.

Example 4

The effect of fluid velocity, processing dwell time (duration of time the polysilicon pieces are subjected to the fluid), mode of subjecting to gas stream, and environment were examined. The samples were subjected to a stream of argon. The velocity of the stream of argon was varied. For purposes of this experiment, velocities in the range of 1350 to 2300 feet/min (6.8-11.7 m/s) are designated as high velocity, and velocities in the range of 900 to 1300 fee/min (4.5-6.6 m/s) are designated low velocity. The polycrystalline samples were subjected to the argon stream as a single piece as in Example 1 or with 15-20 grams of pieces of polycrystalline silicon in a stainless steel mesh basket. The samples were subjected to the stream of argon for either 4 seconds or 20 seconds. The samples were subjected to the argon stream inside a lab hood and also outside a lab hood to examine effect of exhaust.

Control samples and samples treated with the variety of combination of the above features were tested for surface carbon contamination. No significant difference was observed in this laboratory test for inside the hood versus outside the hood. As shown in Table 1, Argon is effective in removing surface carbon particularly if at least one of the longer dwell time or higher velocity as mentioned above is used. Average surface carbon after treatment with argon was 255 ppbw as compared to 313 ppbw for the control. If at least one of longer dwell time or higher velocity is used, the average surface carbon is 238, for an average reduction of surface carbon of 24%.

TABLE 1

Effect of Argon stream on Surface Carbon

| Test ID | Fluid | Velocity (m/s) | Dwell Time (Seconds) | Method of Presenting Polycrys- talline Silicon | Surface Carbon (ppbw) | % Reduc- tion |
|---|---|---|---|---|---|---|
| Control | NA | NA | NA | NA | 313 | — |
| Ah4b | Argon | High | 4 | Basket | 233 | 25 |

TABLE 1-continued

Effect of Argon stream on Surface Carbon

| Test ID | Fluid | Velocity (m/s) | Dwell Time (Seconds) | Method of Presenting Polycrys- talline Silicon | Surface Carbon (ppbw) | % Reduc- tion |
|---|---|---|---|---|---|---|
| Ah4s | Argon | High | 4 | Single | 247 | 21 |
| Ah20b | Argon | High | 20 | Basket | 256 | 18 |
| Ah20s | Argon | High | 20 | Single | 201 | 36 |
| Al4b | Argon | Low | 4 | Basket | 296 | 5 |
| Al4s | Argon | Low | 4 | Single | 311 | .6 |
| Al20b | Argon | Low | 20 | Basket | 263 | 16 |
| Al20s | Argon | Low | 20 | Single | 230 | 26 |

Example 5

An experiment was conducted in a production environment—i.e. comminuted polycrystalline silicon is placed on a conveyor rather than being held as individual pieces or in a basket in front of a high speed fluid, where volumetric loading and speeds are consistent with what is used in production of polycrystalline silicon pieces. A blower is setup to deliver filtered recirculated air at a velocity of 18 m/s. A first vibratory conveyor is used to move polysilicon in the room. The first vibratory conveyor is fitted with air knives used to direct the filtered airstream at the material generating Test samples. A second vibratory conveyor is used to move polysilicon through the room but not through the stream of air generating Control Samples. Polysilicon is allowed to pass beneath the air knives with the intent of removing surface carbon. This conveyor was used to generate the Test Samples. The western conveyor had no air knives. This conveyor was used to generate the Control Samples. Fifty six 15-gram samples of polycrystalline silicon are tested in the LECO RC612 from each of the Test Samples population and the Control Samples population. The Test Samples achieved a mean surface carbon of 212 ppbw while the Control Population had a surface carbon of 270 ppbw. This is a reduction of about 21%. The Range of the results was reduced from 304 ppbw (150-454) for the Control Group to 217 ppbw (133-350) for the Test Group.

Further improvement may be attained with higher velocities, reconfiguration of the processing equipment (e.g. modification of the conveyor an/or exhaust configuration), or through the use of Argon.

Example 6

Test samples were prepared using a Phoenix Ionizing Blower manufactured by Simco-Ion. The Test Sample was generated by placing several polysilicon pieces into a Stainless Steel mesh Basket. The surface charge of the pieces was approximately 0.80 kV after being placed into the basket. The material in the basket continued to decay to around 0.50 kV with time. The material was comprehensively treated with the ionizing blower. The blower provided a recirculated air stream at 7.1-9.1 m/s. The Test Sample was measured to have a charge of –0.04 kV after the treatment. The Control Sample was tested to have a charge of 1.0 kV. After evaluation with the LECO RC612, it was determined that the Test Sample has a surface carbon concentration of 262 ppbw while the Control Sample was at 288 ppbw. The Range of the results was reduced from 138 ppbw (217-355) for the Control Group to 111 ppbw (204-315) for the Test Group.

Test results on the effectiveness of the ionizing blower may have been confounded by the use of a metal basket.

Example 7

Samples were obtained from a production environment. The Test Data represents samples prepared using Ionizing Airknives (i.e. air blow off with ionization) while the Control Data represents samples prepared using Non-Ionizing Airknives (i.e. air blow off without ionization). The speed of the air was about 18 m/s. All other variables were held constant. 28 Test Samples were compared to 28 Control Samples. After evaluation with the LECO RC612, it was determined that the Test Samples had a mean surface carbon concentration of 263 ppbw compared to the Control Samples which had a mean value of 282 ppbw. The Test Samples had both a lower mean, and a lower median surface carbon concentration. While the mean surface carbon concentration was moderately lower, the Test Data was shown to have a statistically-significant reduction in variation among the sample data points—specifically, the range of data for the Control samples was from 178 to 404 ppbw surface carbon (a range of 226) while the range of the amount of carbon with the ionizing air knives was 211-332 (a range of 121). This shows better control with a range reduced by about 46%. Repeating the test showed similar results with a range reduced by 48%. This demonstrates that use of ionizing system to deionize the gas (e.g. air) can improve control of the system.

Example 8

One hundred and twenty eight (128) samples of polycrystalline silicon were collected that had no treatment. These samples were evaluated with a LECO RC612 and were determined to have a mean Surface Carbon Concentration of 303 ppbw. This result was compared to a set of 28 samples of polycrystalline silicon that were exposed to the high velocity air at about 3700 ft/min (19 m/s). These samples were determined to have a mean Surface Carbon Concentration of 154 ppbw. This is a reduction in surface carbon of about 49%.

This disclosure further encompasses the following aspects.

Aspect 1: A method comprising providing a feed stream comprising polycrystalline silicon having surface carbon contamination in an initial amount, subjecting the polycrystalline silicon in the feed stream to a high velocity fluid selected from gas, gas/liquid mixtures, gas/solid mixtures and gas/solid/liquid mixtures to form a product stream comprising polycrystalline silicon having a reduced amount if surface carbon wherein the reduced amount is less than 250, preferably less than 200, more preferably less than 160 parts per billion by weight based on weight of the polycrystalline silicon product, or the reduced amount is at least 20%, preferably at least 30% less than the initial amount, or both.

Aspect 2: The method of Aspect 1 wherein the feed stream comprises pieces of polycrystalline silicon.

Aspect 3: The method of Aspect 2 wherein at least 90% of the pieces of polycrystalline silicon have a minimum dimension of at least 1 mm and a maximum dimension of no more than 250 mm.

Aspect 4: The method of Aspect 2 or 3 wherein at least 90% of the polycrystalline silicon has a maximum dimension in the range of 20 to 50 mm.

Aspect 5: The method of any of the preceding Aspects wherein the high velocity fluid is a gas, preferably air or an inert gas.

Aspect 6: The method of Aspect 5 wherein the high velocity fluid is Argon gas.

Aspect 7: The method of any of the preceding Aspects wherein the polycrystalline silicon feed stream is conveyed into a cleaning region (enclosure) comprising a plurality of nozzles directed at the feed stream thereby subjecting the polycrystalline silicon to the high velocity fluid.

Aspect 8: The method of any of the preceding Aspects wherein the velocity of the fluid is at least 1 m/s, preferably at least 4 m/s, more preferably at least 5 m/s, yet more preferably at least 6 m/s, still more preferably at least 10 m/s, and most preferably at least 15 m/s, and is no more than 40 m/s, preferably no more than 30 m/s, and yet more preferably no more than 20 m/s.

Aspect 9: The method of any of Aspects 1-5 and 7-8 wherein the fluid is air at a velocity of at least 10, preferably at least 15 m/s.

Aspect 10: The method of any of the preceding Aspects wherein the polycrystalline silicon in the feed input stream has a surface carbon contamination of more than 200 parts per billion by weight of the polycrystalline silicon and the surface carbon contamination in the product stream is reduced by at least 20%, preferably at least 30%, from the initial amount of surface carbon contamination in the feed stream.

Aspect 11: The method of any of the preceding Aspects further comprising deionizing the feed stream.

Aspect 12: The method of any of the preceding Aspects further comprising ionizing the fluid.

Aspect 13: The method of Aspect 11 or 12 wherein the variation in the reduced amount of surface carbon is at least 40% lower than without use of the deionizing of the feed stream or ionizing of the high velocity fluid.

Aspect 14: The method of any of the preceding Aspects further comprising isolating removed contaminants while the polycrystalline silicon is subjected to the high velocity fluid.

Aspect 15: A method comprising: providing a feed stream comprising polycrystalline silicon having surface carbon contamination in an initial amount; subjecting the polycrystalline silicon to a stream of Argon gas at a speed of at least 1 meter per second to form a product stream comprising polycrystalline silicon having surface carbon in a treated amount that is less than the initial amount.

Aspect 17: The method of Aspect 15 conducted with the limitations of any one of Aspects 2-4, 7-8, 10-11 or 14.

Aspect 18: A system for removing surface carbon contamination from polycrystalline silicon comprising an enclosure, a conveyer for moving through the enclosure a feed stream comprising polycrystalline silicon having carbon contaminants on a surface of the polycrystalline silicon, at least one stream of a high velocity fluid passing through outlets in the enclosure and directed at the feed stream comprising the polycrystalline silicon, an ionizing source in the enclosure or integrated with the at least one stream of high velocity fluid, and an exhaust system for the enclosure.

Aspect 19: The system of Aspect 18 wherein the ionizing source is integrated with the at least one stream of high velocity fluid.

Aspect 20: The system of Aspect 18 or 19 wherein the ionizing source is an ionizing bar.

Aspect 21: The system of any one of Aspects 18-20 wherein the fluid is selected from gas, gas/liquid mixtures; gas/solid mixtures; gas/solid/liquid mixtures.

Aspect 22: The system of any one of Aspects 18-21 wherein the high velocity fluid is argon.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). Stated upper and lower limits can be combined to form ranges (e.g. "at least 1 or at least 2 weight percent" and "up to 10 or 5 weight percent" can be combined as the ranges "1 to 10 weight percent", or "1 to 5 weight percent" or "2 to 10 weight percent" or "2 to 5 weight percent"). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments. A "combination thereof" is open and includes any combination comprising two or more of the listed components or properties (optionally together with a component or property not listed).

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

What is claimed is:

1. A method comprising
providing a feed stream comprising polycrystalline silicon having surface carbon contamination in an initial amount,
subjecting the polycrystalline silicon in the feed stream to a high velocity fluid of at least 1 m/s, wherein the fluid is selected from gas, gas/liquid mixtures, gas/solid mixtures, and gas/solid/liquid mixtures to form a product stream comprising polycrystalline silicon having surface carbon contamination in a reduced amount of less than 250 parts per billion by weight, or the reduced amount is at least 20% less than the initial amount, or both.

2. The method of claim 1 wherein the feed stream comprises pieces of polycrystalline silicon.

3. The method of claim 1 further comprising taking a sample from the product stream and testing the sample to determine the amount of surface carbon contamination in the product stream.

4. The method of claim 3 further comprising taking a sample from the feed stream and testing to determine the initial amount of surface carbon contamination and calculating a percent reduction in surface carbon contamination in the product stream relative to the feed stream.

5. The method of claim 2 wherein at least 90% of the polycrystalline silicon has a maximum dimension in the range of 20 to 50 mm.

6. The method of claim 1 wherein the high velocity fluid is a gas, wherein the gas is air or an inert gas.

7. The method of claim 1 wherein the polycrystalline silicon feed stream is conveyed into a cleaning region comprising a plurality of nozzles directed at the feed stream thereby subjecting the polycrystalline silicon to the high velocity fluid.

8. The method of claim 1 wherein the velocity of the fluid is in the range 1 to 40 m/s.

9. The method of claim 1 wherein the polycrystalline silicon in the feed stream has a surface carbon contamination of more than 200 parts per billion by weight of the polycrystalline silicon and the surface carbon contamination in the product stream is reduced by at least 30% from the surface carbon contamination in the feed stream.

10. The method of claim 1 wherein the product stream has an amount of surface carbon contamination of less than 200 parts per billion by weight.

11. The method of claim 1 further comprising deionizing the feed stream.

12. The method of claim 11 further comprising ionizing the high velocity fluid.

13. The method of claim 12 wherein deionizing the feed stream or ionizing the high velocity fluid reduces the amount of surface carbon contamination by at least 40%.

14. The method of claim 1 further comprising isolating removed contaminants while the polycrystalline silicon is subjected to the high velocity fluid.

15. The method of claim 1 wherein the high velocity fluid is air at velocity of at least 10 m/s.

16. The method of claim 15 wherein the velocity of the air is at least 15 m/s.

17. The method of claim 6, wherein the high velocity fluid is Argon gas at a speed of at least 1 m/s.

* * * * *